April 1, 1924.

J. F. MYERS

BACK REST FOR SEATS

Filed July 1, 1922

Inventor

J. F. Myers.

By Lacey & Lacey, Attorneys

April 1, 1924.
J. F. MYERS
BACK REST FOR SEATS
Filed July 1, 1922
1,488,825
2 Sheets-Sheet 2
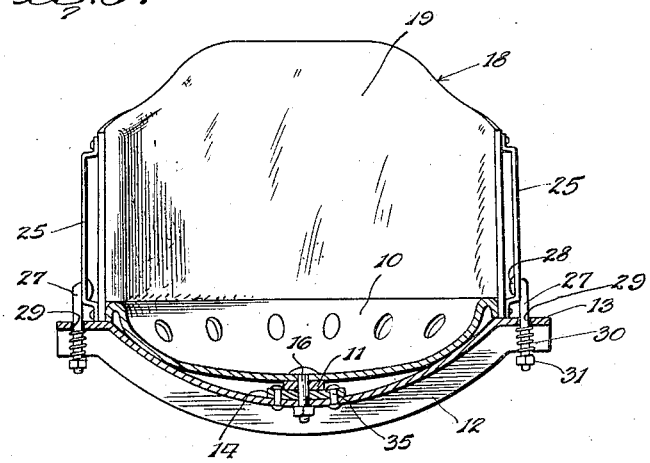
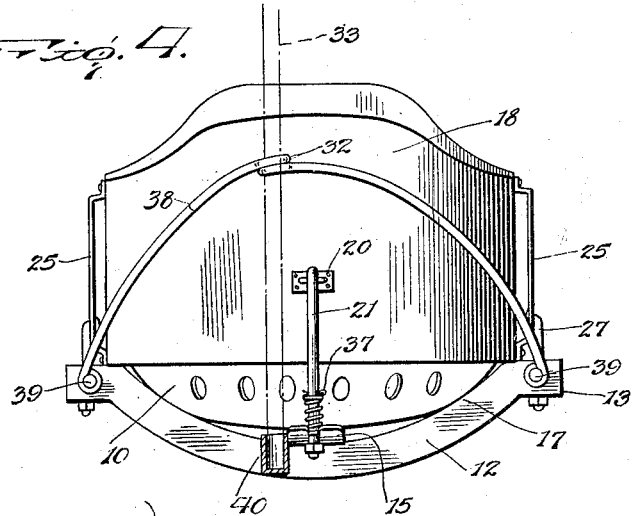
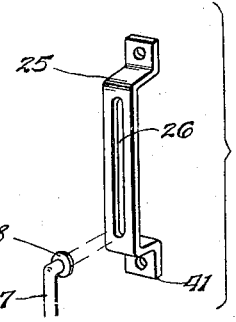
Inventor
J. F. Myers.
By
Lacey & Lacey, Attorneys Patented Apr. 1, 1924.

1,488,825

UNITED STATES PATENT OFFICE.

JOHN F. MYERS, OF HIAWATHA, KANSAS.

BACK REST FOR SEATS.

Application filed July 1, 1922. Serial No. 572,150.

*To all whom it may concern:*

Be it known that I, JOHN F. MYERS, citizen of the United States, residing at Hiawatha, in the county of Brown and State of Kansas, have invented certain new and useful Improvements in Back Rests for Seats, of which the following is a specification.

My invention relates to an attachment for seats and more particularly to the seats of agricultural implements such as harvesters, cultivators, husking machines, or tractors and trailers of any type.

One object of the invention is to provide a back rest which may be attached to existing seats for the protection and convenience of the operator.

A further object of the invention is to provide a back rest which may be folded, when not in use, and, in this manner, form a cover for the seat, at the same time also protecting the inside of the back rest from sun and rain.

And the invention has as a still further object to provide a support behind the back rest in which an umbrella may be carried.

In the accompanying drawing, one embodiment of the invention is illustrated and:

Figure 1 is a side elevation of the back rest in closed position folded over the seat, Figure 2 is a longitudinal sectional view of Figure 1, with the back rest open, Figure 3 is a transverse sectional view on the line 3—3 of Figure 2, Figure 4 is a rear view of the device, and Figure 5 is a perspective view of some of the details.

In the drawings, the reference numeral 10 indicates a seat, preferably made of iron and having the usual shape of seats of this character; that is to say, it has a depressed bottom and upwardly curved edges, and is secured on the agricultural implement by means of a flat bar 11, in the usual manner. As best seen in Figure 3, an arm 12, here shown as made of U-shaped structural material, extends across the underside of the seat and curves upwardly in such a manner that it forms two radial ends 13 which project beyond the side edges of the seat. Another arm 14, extending in rearward direction from the center of the seat and preferably flanged along its sides, also projects beyond the edge of the latter and is formed with a pair of fingers 15 providing a rearwardly opening slot in the arm 14. This arm 14 and the arm 12 are bolted or riveted together under the seat, as seen at 35, and by means of a bolt and nut 16 rigidly attached to the seat 10 and the flat bar 11. As shown in Figure 3 of the drawings, the transverse arm 12 is arcuate in the middle so as to support the seat between the edges, as at 17, and provide space for the arm 14 as well as the bar 11 between the bottom of the seat and the transverse arm 12.

The back rest 18 is of semi-cylindrical shape and is preferably padded, as at 19. On the rear face and about the middle thereof is secured a hinge plate 20 with a loop which carries an eye bolt 21, the lower end of which is threaded and adapted to engage in the slot formed between the fingers 15 on the rearwardly extending arm 14. Between this arm and a collar 22 on the bolt, is inserted a coiled compression spring 23 abutting against a supporting plate 36 straddling the fingers 15, a nut 24 being threaded on the end of the bolt to hold it in position on the arm 14. The collar 22 is held in adjustable position on the bolt 21 by means of a cotter pin 37 for which several holes 42 are bored in the bolt. By shifting the cotter pin along the latter, different amounts of resistance of the spring 23 may be obtained permitting different degrees of tilting of the back rest.

On each side of the back rest 18, and reaching nearly to the top, is provided a strap 25 bolted or riveted thereto and bent outwardly in its middle so as to be spaced from but running parallel to the side of the back rest 18 and having a vertical slot 26. In this slot is engaged an L-shaped bolt 27, the head 28 of which engages on the inside of the strap and is seated in the space provided between the latter and the side of the back rest 18. An aperture 29 is provided for each of the bolts 27 in the radial ends 13 of the transverse arm 12, and a compression spring 30 is carried on the end of each bolt 27 underneath the arm 12 and is held in position by means of a nut 31 threaded on the bolt. The head 28 of the bolt 27 will accordingly be drawn downwardly so as to engage at the lower end of the slot 26, when the back rest is in raised position, as in Figures 2, 3 and 4, while the bottom edge 41 of the strap 25 rests upon the radial arm 13.

Near the upper edge of the back rest 18 and preferably at one side, is formed a loop or eye 32 on a bent rod 38 secured by rivets or bolts 39 to the radial ends 13, and in this loop may be supported an umbrella 33, the lower end of which is carried in a socket 40 secured on the arm 14, as best shown in Figures 1 and 4.

When in use, the back rest is carried as shown in Figures 2, 3 and 4 of the drawings, but when not in use, the back rest is folded as shown in Figure 1. In order to fold the back rest into this position, the spring 23 is compressed sufficiently to permit the eye bolt 21 to slide out of engagement with the fingers 15 on the rearwardly extending arm 14. The seat may now be swung forwardly about the heads 28 of the L-shaped bolts 27 as pivots and slid back until the heads engage with the upper forward ends of the slots 26 in the straps 25. In that position, as seen in Figure 1, the back rest 18 will not only provide a good protection for the seat from rain or snow, but will also protect itself, as the padded portion 19 will lie face downward over the seat and in that manner will not be affected by the elements.

It will now be evident, that on account of the very simple construction of the device, it will only take a few minutes to attach the back rest to a seat without in the least altering an existing one. All that is necessary is to secure the radial arms under the seat with the same bolt that holds the seat and its supporting bar together.

Having thus described the invention, what is claimed as new is:

1. A back rest attachment for seats comprising radial arms on the seat, a rest member, and bolts yieldably held on said arms and having slidable and pivotal connection with said rest member whereby to secure said member in lowered position covering the seat or in upright position above the seat.

2. A back rest attachment for seats comprising radial arms on the seat, a rest member, bolts yieldably held on some of said arms and having slidable and pivotal engagement with the sides of the rest member, and a bolt hinged to the back of the rest member and having releasable engagement with another of said arms.

3. A back rest attachment for seats comprising supporting arms arranged below and projecting beyond the seat, a rest member, offset straps secured on the sides of the rest member and provided with longitudinal slots, and holding devices yieldably mounted in the ends of the arms and having their upper ends engaged in the slots in said straps whereby the rest member may be held in upright position on the seat or in lowered position over the seat.

4. A back rest attachment for seats comprising an arm to be secured below the seat and projecting rearwardly therefrom and having a notched rear end, a rest member, yieldable connecting devices between the sides of the seat and the sides of the rest member, a bolt hinged at its upper end to the back of the rest member and having its lower end fitting in the notched rear end of said arm and engaged with the under side thereof, and a spring coiled around the bolt and exerting pressure at one end upon the bolt and at its opposite end upon the upper side of the arm.

In testimony whereof I affix my signature.

JOHN F. MYERS. [L. S.]